United States Patent
Michelson et al.

(10) Patent No.: US 6,931,119 B2
(45) Date of Patent: Aug. 16, 2005

(54) APPARATUS AND METHOD FOR PROVIDING CALLER-SPECIFIC DATA TO AGENT STATION AND FOR AUTOMATICALLY LAUNCHING CORRESPONDING APPLICATION

(75) Inventors: Mark J. Michelson, Elburn, IL (US); Roger A. Sumner, Batavia, IL (US); Mark J. Power, Carol Stream, IL (US); Carlo Bonifazi, Woodridge, IL (US); Jeffrey D. Hodson, Wheaton, IL (US); Craig R. Shambaugh, Wheaton, IL (US); Robert P. Beckstrom, Bolingbrook, IL (US); Anthony J. Denzonno, Bloomingdale, IL (US)

(73) Assignee: Rockwell Electronic Commerce Technologies, L. L. C., Wood Dale, IL (US)

( * ) Notice: Subject to any disclaimer, the term of this patent is extended or adjusted under 35 U.S.C. 154(b) by 403 days.

(21) Appl. No.: 10/231,623

(22) Filed: Aug. 30, 2002

(65) Prior Publication Data

US 2004/0042612 A1 Mar. 4, 2004

(51) Int. Cl.[7] ................................................. A04M 3/00
(52) U.S. Cl. ........................... 379/265.13; 379/265.01; 379/266.02
(58) Field of Search ...................... 379/265.01–265.14, 379/266.01–266.1, 309

(56) References Cited

U.S. PATENT DOCUMENTS

| 5,127,004 | A | | 6/1992 | Lenihan et al. |
|---|---|---|---|---|
| 5,140,611 | A | | 8/1992 | Jones et al. |
| 5,268,903 | A | | 12/1993 | Jones et al. |
| 5,299,260 | A | | 3/1994 | Shaio |
| 5,555,299 | A | | 9/1996 | Maloney et al. |
| 5,960,073 | A | | 9/1999 | Kikinis et al. |
| 6,046,762 | A | * | 4/2000 | Sonesh et al. ................. 348/16 |
| 6,064,667 | A | * | 5/2000 | Gisby et al. ................. 370/352 |
| 6,097,806 | A | | 8/2000 | Baker et al. |
| 6,163,607 | A | * | 12/2000 | Bogart et al. .......... 379/266.01 |
| 6,289,373 | B1 | | 9/2001 | Dezonno |
| 6,349,137 | B1 | | 2/2002 | Hunt et al. |
| 2003/0123642 | A1 | * | 7/2003 | Alvarado et al. |

* cited by examiner

Primary Examiner—William J. Deane, Jr.
(74) Attorney, Agent, or Firm—Welsh & Katz, Ltd.

(57) ABSTRACT

A method and apparatus provides data to an agent station associated with a transaction processing system. The data corresponds to an incoming call routed from a caller through a communication network to the agent station, where the incoming calls are based on voice-mode communication and/or text-mode communication. The method includes the steps of receiving the incoming call from the communication network, obtaining caller-specific data corresponding to the incoming call, inspecting the caller-specific data to determine a specialty type corresponding to the incoming call, selecting an selected agent station based upon the determined specialty type and routing the incoming call to the selected agent station, transmitting the caller-specific data to the selected agent station, and automatically launching or maximizing an application on the selected agent station so that the application and corresponding call-specific data is available to the agent when the agent services the incoming call.

37 Claims, 5 Drawing Sheets

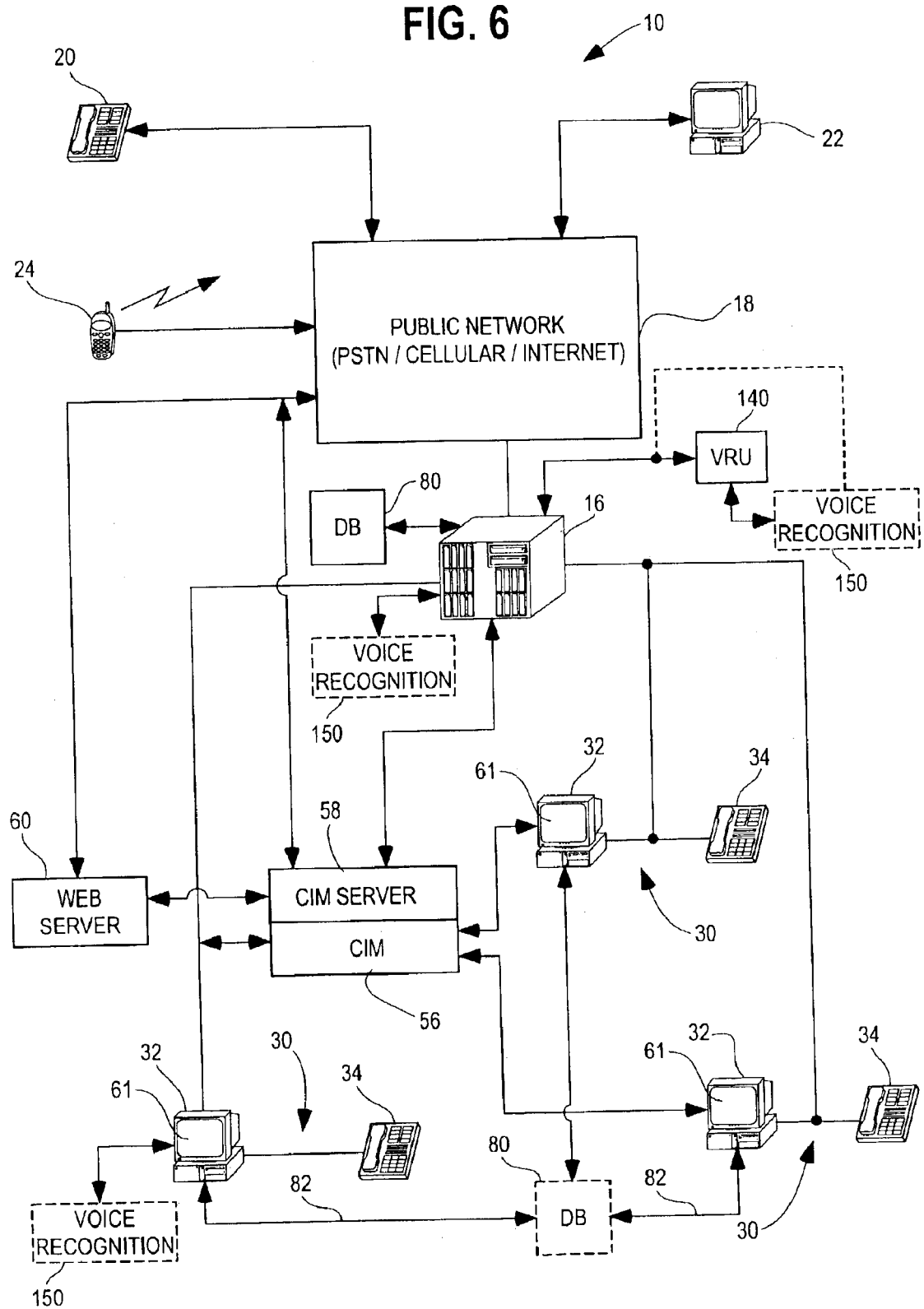

APPARATUS AND METHOD FOR PROVIDING CALLER-SPECIFIC DATA TO AGENT STATION AND FOR AUTOMATICALLY LAUNCHING CORRESPONDING APPLICATION

FIELD OF THE INVENTION

The present invention relates generally to an apparatus and method for providing data to an agent station in a transaction processing system and/or an automatic call distribution system ("ACD"), and more specifically to an apparatus and method for providing caller-specific data and automatically launching a corresponding application based upon the caller-specific data corresponding to the incoming contact.

BACKGROUND

Systems that automatically distribute customer contacts or calls (generically referred to as "ACD") are often employed in telemarketing environments in which agents stationed at agent telephone sets answer many different types of telephone calls and other types of customer contacts (e.g., VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, ACD's may be used exclusively by or on behalf of a single vendor such that all of the contacts processed by the agent involve one particular vendor.

Often, a customer call is distributed to an agent that involves interactive voice dialog. This means a normal two-way verbal exchange. An ACD, however, may also distribute a non-voice dialog contact or call to the agent. This does not involve direct two-way speech between the agent and the customer or caller. Non-voice dialog communication may be, for example, emails, facsimile, chat room dialog, instant messaging, Internet, etc. and the like. This is becoming more common as Internet traffic and electronic sales transactions increase. Handling of the non-voice dialog contact may require a specialized device or subcomponent of the ACD. In this situation, the agent may typically view text on a display screen that the caller typed in or transmitted. In response, the agent may provide information to the contact or request information from the caller, via the keyboard or other input device. Essentially, the dialog between the agent and the caller occurs on a display screen. Further, the agent may handle multiple calls. For example, the agent may typically handle two to five (or more) simultaneous non-voice dialog communications or transactions, which may be presented as two to five separate dialog windows on the display screen, which windows may, for example, be tiled or layered. Of course, the number of simultaneous transactions may vary significantly.

Typically, if a voice dialog or voice mode communication is received by the ACD system and routed to the agent, the agent responds verbally and engages in a voice dialog with the caller. Similarly, if a text-base message, such as email or chat, is received by the agent, the agent may typically respond using the same medium, for example, the agent may type his or her response and transmit the message to the caller. Regardless of the medium, the incoming call usually deals with a specific area, such as customer service, customer complaint, sales, and the like.

In known transaction processing systems, data provided by the caller may not be transmitted to the agent station to whom the caller is routed. Such information is often recollected by the agent, which is inefficient. Further, known transaction processing systems usually route a call to a first available agent. However, it would be advantageous if the call were routed to a preferred agent based upon the information provided by the caller or based upon other information obtained about the caller.

Additionally, in known transaction processing systems, the agent must invoke or "maximize" the appropriate application software or application screen to handle the customer's needs. This is somewhat time consuming and inefficient, and may cause unnecessary delays, which may lead to customer dissatisfaction. It would be advantageous if an appropriate software application was automatically invoked or "maximized" upon receipt of pertinent caller information so that the application and the corresponding data are available to the agent substantially simultaneous with the agent receiving the call.

SUMMARY

The disadvantages of present transaction processing systems may be substantially overcome by a novel apparatus and methods of providing caller-specific data to an agent station and automatically launching or maximizing a corresponding application.

More specifically, in one embodiment, a novel method provides data to an agent station associated with a transaction processing system. The data corresponds to an incoming call routed from a caller through communication network, for example, a public switched telephone network (PSTN) or other communication network to the agent station, where the incoming calls are based on voice-mode communication and/or text-mode communication. The method includes the steps of receiving the incoming call from the telephone or communication network, obtaining caller-specific data corresponding to the incoming call, and inspecting the caller-specific data to determine a specialty type corresponding to the incoming call. The method of the embodiment also includes selecting an agent station based upon the determined specialty type and routing the incoming call to the selected agent station, transmitting the caller-specific data to the selected agent station, and automatically launching or maximizing an application on the selected agent station so that the application and corresponding call-specific data are available to the agent when the agent services the incoming call.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 6 is a pictorial representation of a specific embodiment of a transaction processing system including a voice recognition device.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
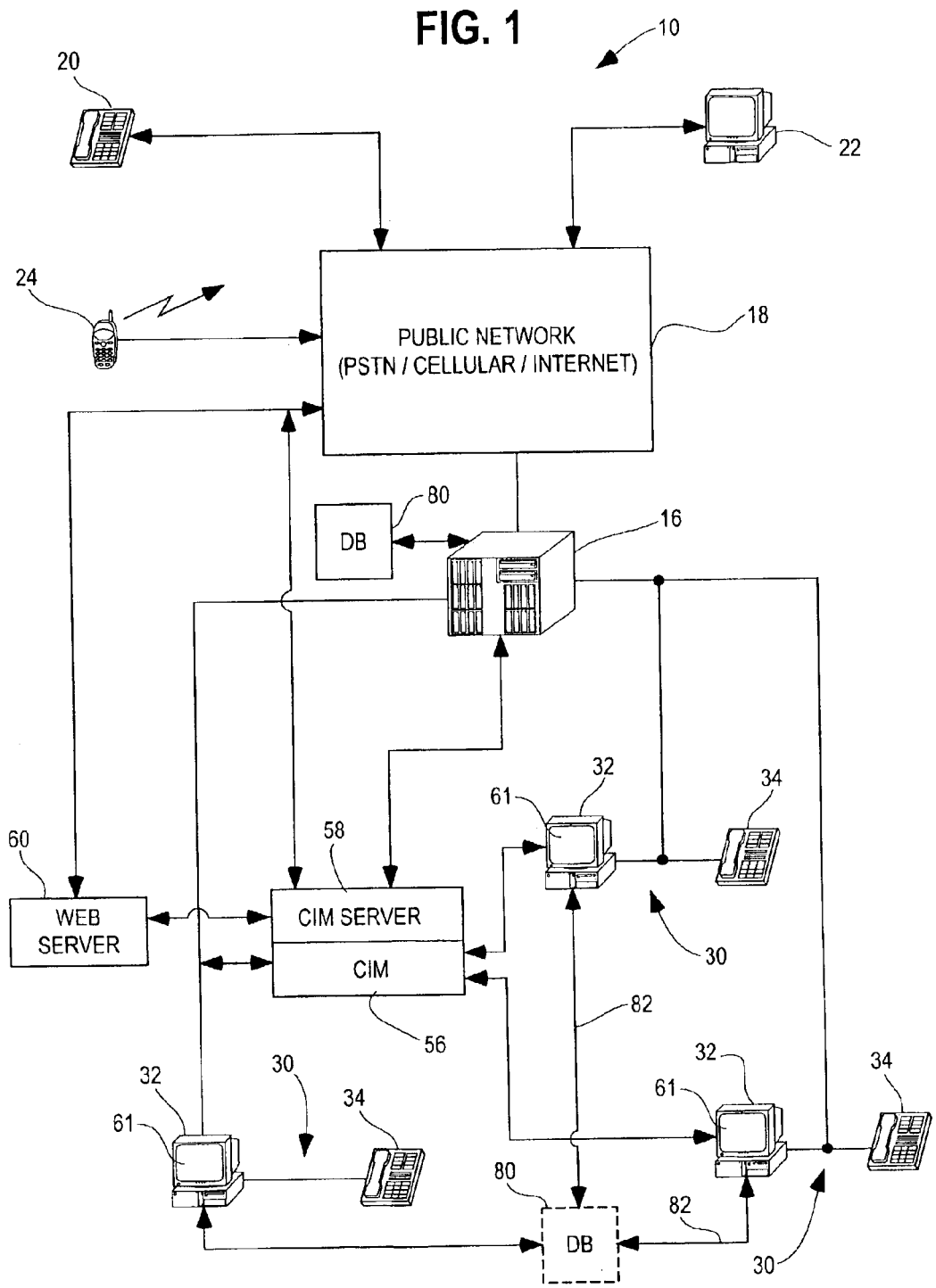
FIG. 1 is a pictorial representation of a specific embodiment of a transaction processing system.

Referring now to FIG. 1, an exemplary embodiment of a system 10 for facilitating routing of incoming calls or contacts ("transactions") to agents associated with a transaction processing system, which may also be referred to as an automatic call distribution or automatic contact distribution system (ACD) 16, is shown generally. The ACD 16 may process both voice-dialog communications or transactions, as well as non-voice dialog communications and transactions, as described hereinafter. The present invention may be implemented in numerous types and sizes of systems for distributing calls to selected ones of a plurality of agents. Examples of ACD systems that may be used in the present invention are the SPECTRUM ACD and Transcend ACD products available from Rockwell FirstPoint Contact.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

In the illustrated embodiment of FIG. 1, a customer or caller may be connected to the ACD 16 through a public switched telephone network (PSTN) 18 (or any suitable communication network), which caller may connect to the PSTN through a standard telephone set 20, a computer 22, a cellular telephone 24, or any suitable communication device. Note that the term "caller" as used herein does not necessarily mean that the contact or person using the telephone 20, for example, initiated the call to the agent. Notably, the agent or the system may have initiated the call to the contact. Accordingly, the term "caller" shall broadly refer to the contact or potential customer even though, for example, the agent may have originated or initiated the call or contact. Additionally, the term "call" may be a telephone call, or it may be any other form of communication (emails etc.) as set forth above.

In the illustrated embodiment, multiple agent stations or terminals 30 are shown coupled to the ACD 16. For purposes of illustration, only three agent stations 30 are shown, but any suitable number of agents or agent stations may be coupled to the ACD 16. The agent stations 30 may also include agent station computers 32 or terminals, and/or telephone sets 34.

Figure 2:
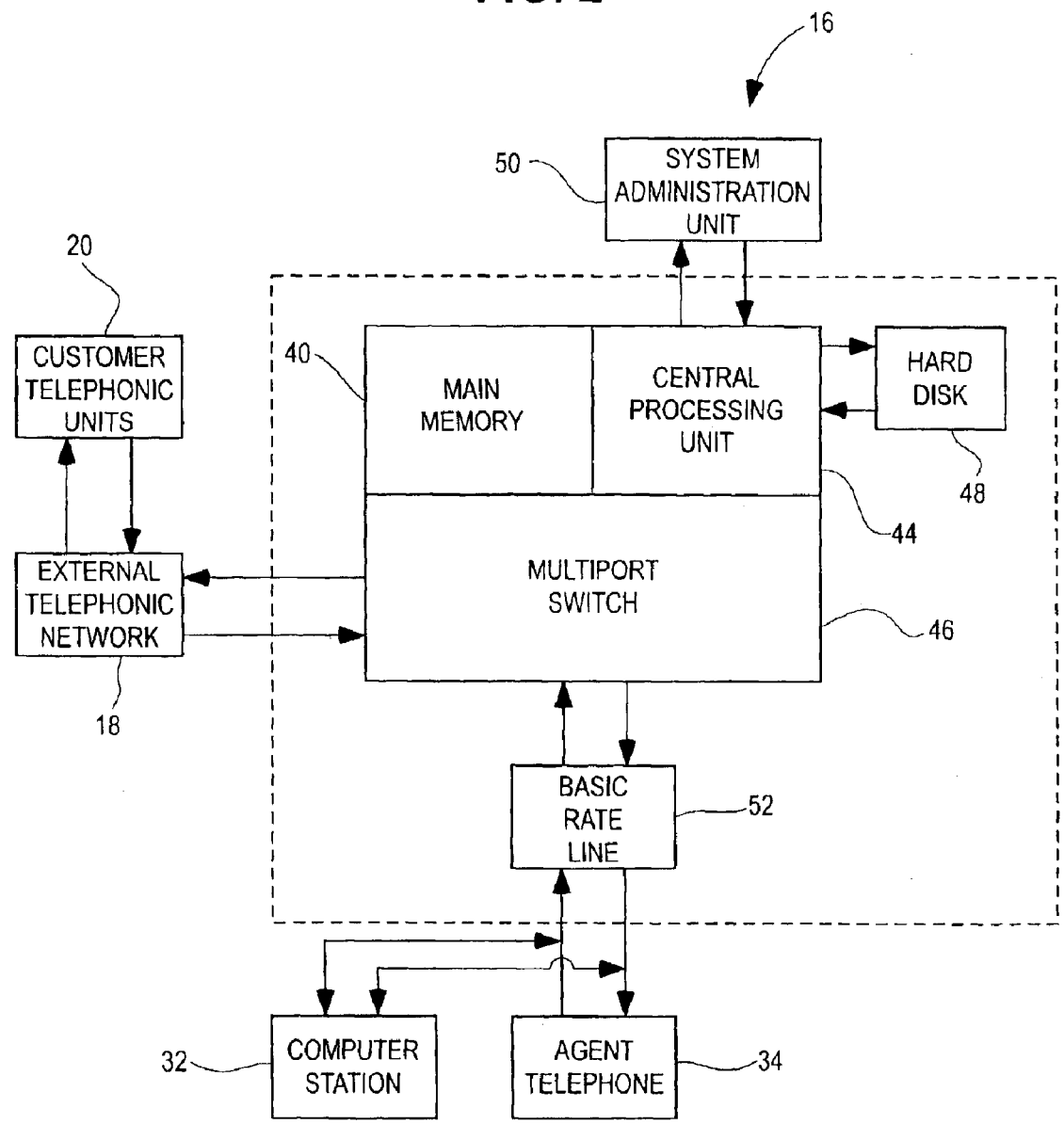
FIG. 2 is a functional block diagram of a specific example of a known automatic call distributor system.

Referring now to FIGS. 1 and 2, FIG. 2 shows an example of the ACD 16 in greater detail. The ACD 16 may comprise hardware and/or software and, for example, may include a main memory 40, a central processing unit 44 and a multi-port switch 46, each of which may be separate units, distributed components, or integrated at a single location or single cabinet. The multiport switch 46 as shown is coupled to the PSTN 18, which in turn, is connected to customer telephones 20 or other communication devices (20, 22, or 24). The central processing unit 44 may include storage, such as hard disk storage 48, and may also be coupled to a system administration unit 50. The ACD 16 is connected through a suitable communication link to the plurality of agent telephonic sets 34 (only one shown), for example, through a basic rate line 52, as is known in the art. Agent computer stations 32 and the agent telephone sets 34 may be incorporated into single units, as is known in the art.

The illustrated ACD 16 may handle voice communication and may also handle non-voice communication, such as emails, facsimile, chat room dialog, instant messaging, Internet, etc. Non-voice dialog communication is another form of contact communication and the ACD 16, when configured and coupled to appropriate hardware and/or software devices, as described below, is not limited to processing voice-based telephone calls. The ACD 16 may be a single integrated device, or may include distributed hardware and software. In one specific embodiment, the SPECTRUM ACD product available from Rockwell FirstPoint Contact may include a non-voice dialog communication processor, such as a Contact Integration Manager (CIM) 56, as shown in FIG. 1, which may, for example, be a CIM Release No. 1.1, which is also available from Rockwell FirstPoint Contact. In the specific embodiment shown, the communication processor 56 or CIM (also referred to as non-voice dialog communication processor or communication processor) may handle the non-voice dialog communication between the customer or caller, and the agent.

In the embodiment of FIG. 1, the communication processor 56 may be operatively coupled to the ACD 16 and to the agent computer 32 or agent stations 30. Typically, the communication processor 56 receives email, chat room dialog, facsimile, instant message, Internet communication, and the like from a communication processor server 58. The communication processor server 58, in turn, may receive additional non-voice dialog contact communication from a web server 60, which may be connected to the PSTN 18 or some other communication network, as is known in the art.

In one specific embodiment, the communication processor 56 may be separate from the ACD 16 and operatively coupled to the ACD 16. Alternatively, the communication processor 56 may be integrated into a portion of the ACD 16 or any other processor or processors in the system. In another embodiment, at least a portion of the communication processor 56 functionality may be part of the agent station computer 32, which may be, for example, a personal computer. The communication processor 56 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like.

With respect to the apparatus and method described herein, the term ACD 16 is used interchangeably to mean either the ACD and/or the communication processor 56, or a combination of both. Both terms relate to a "transaction processing system" and because the ACD 16 and the communication processor 56 may be so closely related or the functions so distributed that a meaningful distinction may not be able to be made with respect to which particular component is performing a specific step described. Accordingly, for purposes of illustration only, the below-described method will be described in terms of an embodiment in which the ACD 16 performing the step, the communication processor 56 performing the step, or the transaction processing system performing the step, even though a separate component or subcomponent, such as another of above-mentioned components, may actually perform the step or process.

The communication processor 56 in the illustrated embodiment is configured to facilitate sending and receiving non-voice dialog communication between the caller and the agent or agent terminal 30, and to transmit a signal to the ACD 16 indicating that the communication processor received the non-voice dialog communication from the caller. In a specific embodiment illustrated in FIG. 1, the signal from the communication processor 56 to the ACD 16 may create a "call appearance" so that the ACD is brought into the communication "loop," and is able to track the contact. The call appearance simulates to the ACD 16 the appearance of a voice-type call, even though a voice-type call is not present. Once the call appearance to the ACD 16 has been made, the ACD can queue and track the non-voice dialog communication to the appropriate agent as if the call were an ordinary interactive voice-dialog call, even though the ACD may not utilize or connect its voice channel to the agent. Rather, the communication processor 56 may handle the non-voice dialog communication and provide the call to the agent, and also inform the ACD 16 regarding the status and initiation of the call.

Accordingly, once the call appearance has been made, the ACD 16 in the illustrated embodiment of FIG. 1 selects a particular agent to receive the non-voice dialog communication from the communication processor 56 using any suitable selection technique, and then causes the non-voice dialog communication to be routed to the selected agent by the communication processor. In known automatic call distribution systems, selection of the agent is performed according to any suitable method including known methods, such as the agent's availability, time past since prior contact, number of calls previously processed by the agent, skill or efficiency rating of the agent, and the like.

In known ACD systems, when such a contact is routed to an agent, the system notifies the agent that a call has arrived, by means known in the art. For example, a message may appear on the agent station 30 and/or an audible signal may be sent to the agent. If the incoming call is a voice dialog communication, the agent speaks with the caller. If the incoming call is a text-based communication, the agent may, for example, communicate with the caller by reading and typing messages on the agent station 30 or agent computer.

The ACD or transaction processing system 16 preferably routes voice dialog communication to the selected agent station 30 for servicing by an associated agent using the agent telephone 34 or headset. In conjunction with the communication processor 56, the transaction processing system 16 may, for example, route non-voice dialog or text-based communication to the selected agent station. Again, as set forth above, the communication processor 56 need not be separate or apart from the transaction processing system 16 and may be operatively incorporated into the transaction processing system. In operation, the transaction processing system 16 and/or the communication processor 56 routes incoming calls from the callers to the agents, where the incoming calls may be routed from the callers over the PSTN 18 or other suitable communication network. The incoming calls may be voice dialog communication or non-voice dialog communication, such as VoIP (voice-over Internet protocol), email, facsimile, chat room dialog, instant messages, and other Internet contacts.

In many known transaction processing systems, the incoming telephone call, email, chat dialog, etc. (also referred to as the incoming "contact") is routed to an agent based on the availability of the agent. As described herein, it is advantageous to route the incoming call to an agent depending upon the content of the call or caller-specific data corresponding to the incoming call or caller, and to provide the selected agent with such caller-specific data. Additionally, a software application or associated "screen" corresponding to the context of the incoming call may be automatically launched or "maximized" substantially simultaneous with the agent receiving the incoming call so as to increase agent efficiency. The data or screen is preferably viewed on a display screen 61 associated with each of the agent stations.

As is known in the art, an incoming call may include ANI (automatic number identification) fields and/or DNIS (dialed number information service) fields, which may contain specific information corresponding to the incoming call. In one specific embodiment, the ACD 16 or the communication processor 56 may inspect the ANI data to determine the caller's originating calling number. This is also referred to as caller-ID.

Referring to FIG. 1, once the caller's originating number is ascertained, the originating number may be used to access a database 80. The originating number may be used directly as a pointer into the database 80 or may be manipulated to conform to a suitable indexing standard, as may be defined by the database. Any suitable database 80 or memory system may be used, which database or memory may, for example, be incorporated or distributed within the ACD system 16, the transaction processing system 56, or the agent station 30. It may also be remotely located from the above-mentioned components and may be connected thereto by a local area network (LAN) or other communication link 82. Note that for purposes of clarity only, the database is also shown in dashed lines coupled to each of the three agent stations via a LAN.

Assuming that the caller has a prior calling history, the database 80 can provide additional information about the caller. Of course, if the caller is a first time caller, a new entry may be made in the database 80 regarding the caller and the substance of the transaction. The additional information about the caller, preferably obtained from the database 80, may permit a determination of a preferred specialty type. The specialty type is an indication of which agent station or agent is best suited to handle the transaction. Agents may be associated with various departments in the transaction processing system where many different business departments may be associated with a particular transaction processing system. One agent or group of agents may be best suited to handle a particular type or category of call or "specialty type."

Figure 3:
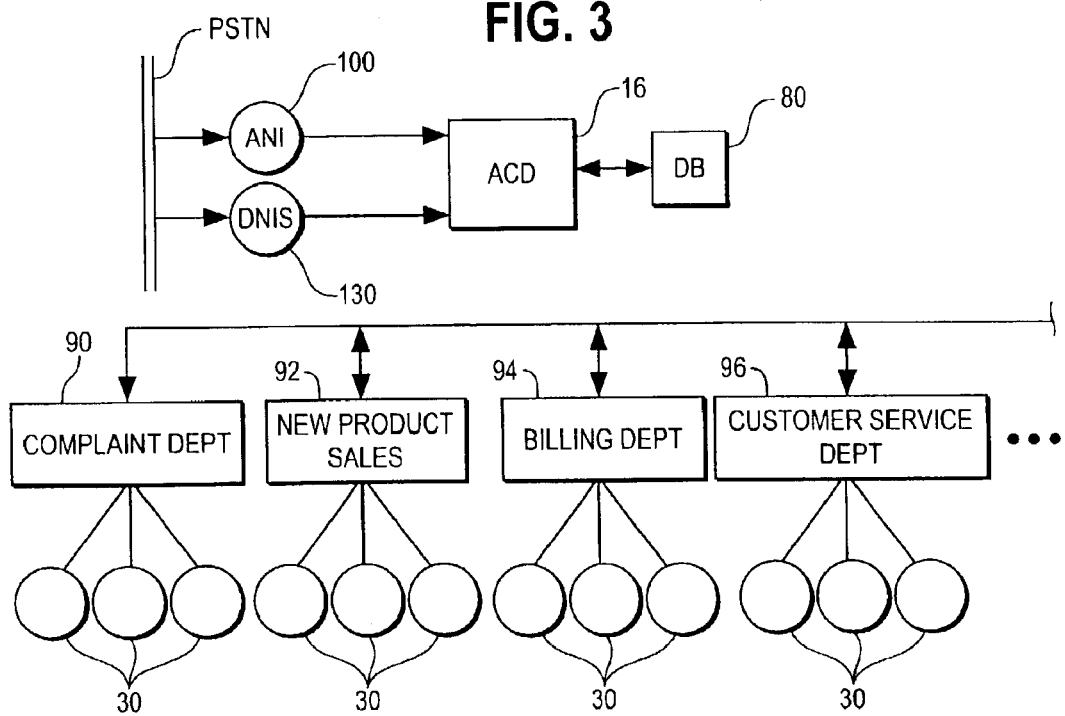
FIGS. 3 and 4 are pictorial views of a specific embodiment of a transaction processing system and representational departments connected thereto.

Referring now to FIG. 3, for example, the transaction processing system 16 may route incoming calls to agents associated with a complaint department 90, a new product sales department 92, a billing department 94, a customer service department 96, and the like. Of course, any number of departments or categories may exist depending upon the environment in which the transaction processing system 16 is operating, and each department may have numerous agent stations 30 or agent station computers 32 and associated agents.

For purposes of efficiency, in some call centers, a particular agent may handle transactions of only one type, i.e., within one department. In the above-described embodiment, for example, the database 80 entry based on ANI data 100 corresponding to the incoming call may reveal that this particular caller has purchased many new products over the last two years, and that he has only transacted business with the new product sales department. The transaction processing system 16 may determine that the most likely candidate agent to whom to route the incoming call is an agent in the new product sales department. Accordingly, the call may be routed to the new product sales department 92 for servicing by the agent.

In the above-described example, a determination of the specialty type is "inferred" rather than being directed. Such inference is based upon known data or a priori information, such that a calculation or determination is made as to the most likely specialty type to assign. This determination may not always be correct, depending upon the caller's intentions. This method is different than a "directed" approach where the caller directly specifies the agent or department to which he or she wishes to speak.

Figure 4:
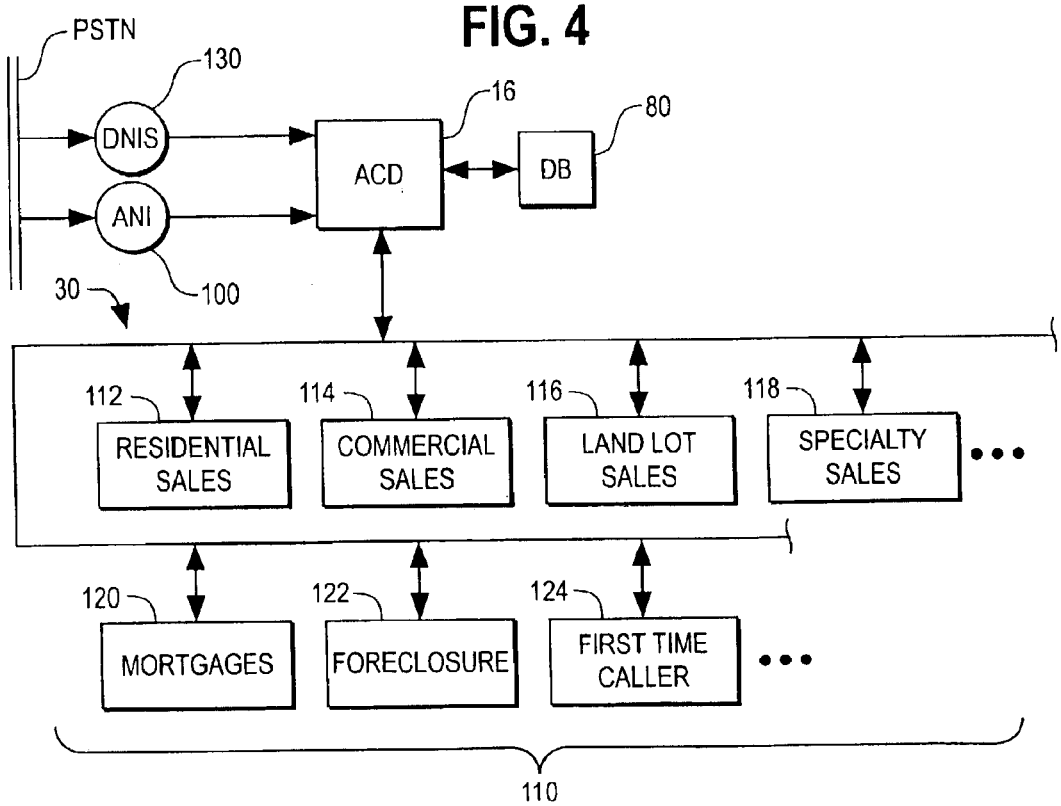

Referring now to FIG. 4, in another specific example, the transaction processing system 16 may be associated with a real estate business 110. In such a system, various departments may exist, such as residential sales 112, commercial sales 114, land lot sales 116, specialty sales 118, mortgage transactions 120, foreclosure 122, first time callers 124, and the like. If the ANI data 100 reveals that the incoming call is from a mortgage company, the system 16 may determine that the most likely department to route the call to is the mortgage transaction department 120. Accordingly, the transaction processing system 16 may route the incoming call to that department because the database 80 may list the specialty type as "mortgage department" under the entry in the database corresponding to the incoming telephone number, which incoming telephone number was obtained from the ANI field 100. Again, this is an example of assigning a specialty type based on an inference, where the result of the inference was stored in the database 80, and was based upon past "experience."

Of course, if the caller merely wishes to speak to someone in residential sales, but happens to have called from his place of business, namely, the mortgage company, the call could be routed to the wrong department. In that case, the agent answering the incoming call would preferably forward the call to the residential sales department or corresponding agents to handle the transaction.

Once the call is routed to the agent station having a specialty type matching the "determined" specialty type corresponding to the incoming call, all of the available data or such pertinent portion thereof regarding the caller (caller-specific data), such as data contained in the database 80, is also routed to the agent station 30 so that the agent may view the data on the display screen 61. Simultaneously, the appropriate software application or application screen may be launched or "maximized" on the agent display screen 61 without action by the agent. For example, with respect to the above-mentioned example, one particular agent may have several software applications running simultaneously on the display screen 61, such as a "mortgage transactions" application and a "foreclosure" application, because he may be able to handle or "field" transactions pertaining to both of these departments.

With respect to the software applications, in a multi-tasking environment, such as in a WINDOWS based operating system, one of these applications may, for example, be running in the foreground (i.e., "maximized") while the other may be running in the background (i.e., "minimized") such that its associated icon is visible only on a "toolbar," as is known in the art. In one embodiment, when the caller-specific data corresponding to the incoming call is routed to the selected agent station, the appropriate software application or screen is maximized. The appropriate application is automatically maximized because the transaction processing system 16 sends the corresponding data, for example, over a network, such as a local area network (LAN), using an address unique to that particular agent station. Specifically, the transaction processing system 16 may address the data to a specific TCP/IP port so that the application is automatically maximized in response to the receipt of data at that port address, as is known in the art.

Figure 5:
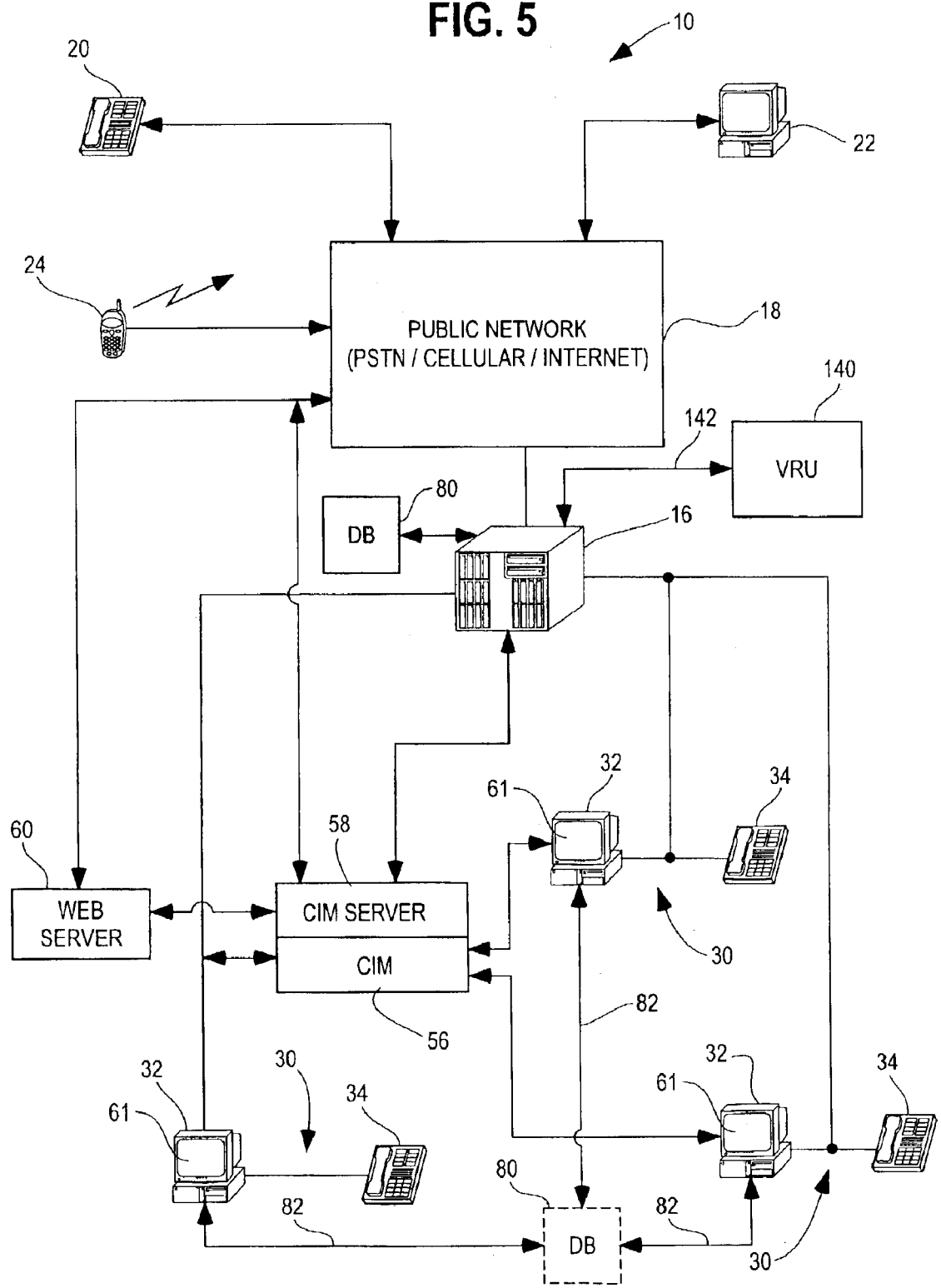
FIG. 5 is a pictorial representation of a specific embodiment of a transaction processing system including a voice response unit.

In another embodiment, DNIS (dialed number information service) fields 130 associated with the incoming call may provide certain information, as is known in the art. Such call-specific parameters may be provided by the caller in response to automated prerecorded messages initially played to the caller. Referring now to FIG. 5, the transaction processing system 16 may initially provide the caller with a recorded or automated voice message, which requests certain information or predetermined data from the caller. Like reference numerals are used to show like structures throughout the various views. In one specific embodiment, the automated voice message may be provided by a voice response unit (VRU) 140, which may be connected to the ACD 16. The VRU 140 is preferably part of or incorporated into the ACD 16, but is not necessarily connected in the manner. For example, the VRU 140 may be separate and apart from the ACD 16 and may be operatively coupled to the ACD via a local area network 142, as is known in the art. The VRU 140 may be programmed to request certain information from the caller, which of course, may be changed to accommodate various applications and business environments.

In response to the recorded message from the VRU 140, the caller may then use the touch-tone key pad of the calling device 20 to enter the requested information. For example, the caller may be asked whether the call concerns a complaint or a purchase. The caller's digit entries may be stored in the DNIS fields 130 (FIGS. 3 and 4) associated with the incoming call. Accordingly, the ACD 16 may inspect the DNIS information and pass this information along to the agent station 30.

In another embodiment for example, the caller may be asked to provide his or her social security number, credit card number, account number, and the like. If the caller provides this information, such as his or her account number, additional information may be available about the caller from the database 80, which may be accessible to the ACD 16 or to the VRU 140. Such information or caller-specific data may be transmitted to the agent station 30 or agent computer 32 selected to handle the incoming call or contact.

Referring now to FIG. 6, alternately, the above-mentioned automated voice message may request information from the caller to which the caller may respond verbally. A suitable speech recognition device 150 or software module may be used to decode the caller's spoken response and convert the response into the appropriate digital data. Moreover, voice recognition methods may be more convenient for the caller, as it may be awkward to obtain alphanumeric characters, such as the letters of the caller's name or address, through the caller's touch-tone key pad. Callers are generally impatient with this approach and tend not to complete the call. In either case, the VRU 140 may receive the requested data from the caller.

Such suitable speech recognition devices 150 or software may be any such speech recognition package with adequate speech characteristics, for example, Dragon Naturally Speaking, available from Dragon Systems, or ViaVoice For WINDOWS, Professional Edition, available from IBM Corporation. The aforementioned voice recognition devices or software packages may be implemented as a software module, and thus, may run on the agent station 30. However, such voice recognition systems 150 may also include separate hardware signal processors, such as digital signal processors and other hardware-based components.

The speech recognition device 150 may be part of the agent station 30, the ACD system 16, the VRU, or the communication processor 56, or may be separate and apart therefrom. Accordingly, the speech recognition device 150 is shown in dashed lines connected to several alternate devices. The speech recognition device 150 receives spoken human speech, recognizes the individual spoken words, and provides a text-based digital output of the spoken words, as is known in the art. Similarly, the speech recognition device 150 may also provide text to a voice capability ("voice synthesis"), as is known in the art.

Regardless of the method in which the DNIS fields are populated (i.e., by button depression by the caller or by voice recognition), the data obtained from the DNIS field may be used to directly provide the caller-specific data or may be used to indirectly provide the caller-specific data. When used indirectly, for example, the caller-specific data may be obtained from the database 80 accessible via the account number that the caller caused to be populated in the DNIS field. When used directly, for example, the caller-specific data, such as a product number, may be keyed in by the caller in response to a specific prerecorded message played by the VRU 140 Accordingly, using this approach, the product number or caller-specific data may be transmitted to the agent station 30 along with the routed call. In that way, the agent receives the product number substantially simultaneously with the routed call, thus the caller need not enter the product number twice or repeat the number to the agent.

Determination of the specialty type may also be directly specified by the caller. For example, the prerecorded announcement provided by the VRU 140 may ask the caller to which department he desires to be connected. In response thereto, the caller may key in the number code for the "mortgage department," as set forth by the prerecorded message (i.e., "press 6 for the mortgage department") In this case, the caller is routed to an agent having a specialty type equal to the mortgage department. If the caller has also provided additional information in response to the prerecorded message, such as account number, additional caller-specific data may be provided to the agent corresponding to the incoming call, as described above. Of course, any suitable data may be provided by the caller and carried by the DNIS field, subject to applicable digit length constraints. For example, the caller may provide an account number, credit card number, social security number, and the like.

In an alternate embodiment, if an incoming call is text-based, such as email, instant messages, chat room dialog and the like, additional information may be available above and beyond that which was made available from the database 80. For example, rather than the VRU 140 "verbally" requesting a response from the caller, as described above, the transaction processing system may transmit an initial text message to the caller that requests certain detailed information. In this mode, the caller need only type his or her response. The caller is thus not burdened with entering the requested information via the touch-tone key pad. Accordingly, this provides a more robust method for obtaining information about the caller. Thus, the caller may easily provide the caller-specific information. Alternatively, the agent may type a text message and the VRU 140 may synthesis a voice message to be transmitted to the caller.

In this mode, however, the transaction processing may "analyze" the data provided by the caller to "infer" the appropriate specialty type corresponding to the call. Such inference or determination permits the transaction processing system 16 to route the incoming call to the appropriate agent station. Various techniques for analysis may be used, such as artificial intelligence and fuzzy logic, as is known in the art. Such analysis techniques may also be applicable to previously described embodiments where voice recognition is used to convert the caller's spoken words into digital data.

Again, as with all of the described embodiments, the appropriate software application or screen may be launched or maximized on the agent computer 30 upon receipt of the pertinent caller-specific data so that the agent not only has the appropriate application running and available at the time he receives the incoming call, but he also has the caller-specific data available to him to use accordingly in handling the transaction.

Specific embodiments of a transaction processing system according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method for providing data to an agent station associated with a transaction processing system, the data corresponding to an incoming call routed from a caller through a communication network to the agent station, the incoming call based on voice-mode communication and/or text-mode communication, the method comprising the steps of:

receiving the incoming call from the communication network;

obtaining caller-specific data corresponding to the incoming call, said caller-specific data obtained from a database accessed via an index or pointer derived from data contained in DNIS or ANI fields associated with the incoming call;

inspecting the caller-specific data to determine a specialty type corresponding to the incoming call;

selecting an agent station based upon the determined specialty type, and routing the incoming call to the selected agent station;

transmitting the caller-specific data to the selected agent station; and automatically launching or maximizing an application on the selected agent station based on the specialty type so that the application and the corresponding call-specific data are available to the agent when the agent services the incoming call.

2. The method according to claim 1 wherein the caller-specific data corresponding to the incoming call is obtained from a database.

3. The method according to claim 2 wherein database is accessed by an index or pointer derived from data contained in a DNIS field associated with the incoming call.

4. The method according to claim 1 wherein the caller-specific data is obtained from a database containing data corresponding to the incoming call, and wherein data contained in an ANI field associated with the incoming call facilitates database access.

5. The method according to claim 1 wherein the caller-specific data is obtained from a database containing data corresponding to the incoming call, and wherein data contained in a DNIS field corresponding to the incoming facilitates database access.

6. The method according to claim 5 wherein the caller-specific data obtained from the DNIS field corresponds to data selected from the group of data consisting of account number, credit card number, social security number, name, and address.

7. The method according to claim 1 wherein the caller-specific data is contained in DNIS fields corresponding to the incoming call.

8. The method according to claim 7 wherein the data contained in the DNIS field directly specifies the specialty type.

9. The method according to claim 1 wherein the caller-specific data is provided by the caller in the form of a text message.

10. The method according to claim 1 wherein the caller provides the text message in response to a request from the agent, agent station, or a transaction processing system.

11. The method according to claim 2 wherein the specialty type is inferred based on data corresponding to the caller obtained from the database.

12. The method according to claim 2 wherein the specialty type is inferred based on prior call information associated with the caller, the prior call information contained in the database.

13. The method according to claim 9 wherein the specialty type is inferred based on data corresponding to the text message sent by the caller.

14. The method according to claim 1 wherein the caller-specific data is derive from the content of at least one of the voice-mode and text-mode communication.

15. The method according to claim 1 wherein the transaction processing system further includes a voice response unit configured to request information from the caller;

a voice recognition device configured to recognize verbal responses provided by the caller in response to the request from the voice response unit, and convert said verbal responses into digital data; and the digital data being provided to the agent station as the caller-specific data.

16. The method according to claim 15 wherein the caller-specific data corresponding to the incoming call is obtained from a database, and wherein the database is accessed by an index or pointer derived from said verbal responses.

17. The method according to claim 1 wherein the transmitted caller-specific data causes a corresponding application to be launched or maximized on an agent display screen.

18. A transaction processing system configured to route incoming calls from callers to agents corresponding to agent terminals associated with the transaction processing system, the incoming calls based on voice-mode communication and/or text-mode communication, the incoming calls routed from the caller to the agent terminal through a communication network, the system comprising:

a communication processor configured to facilitate sending and receiving at least one of the voice-mode and text-mode communications between the caller and the agent;

a plurality of agent terminals operatively coupled to the communication processor, each agent terminal having a display screen for displaying data;

a voice response unit accessible to the transaction processing system and configured to prompt the caller to provide requested caller-specific data to the transaction processing system;

a database having entries corresponding to a plurality of callers, the database accessible via an index derived from the caller specific data or from data contained in DNIS or ANI fields associated with the incoming call;

wherein a specialty type corresponding to the incoming call is determined based on the database entry, and the incoming call along with the caller-specific data is routed to a selected agent station based upon the determined specialty type, and wherein an application on the selected agent station is automatically launched or maximized based on the specialty type so that the application and the corresponding call-specific data is available to the agent when the agent services the incoming call.

19. The system according to claim 18 wherein the caller-specific data corresponding to the incoming call is obtained from a database.

20. The system according to claim 19 wherein the database is accessed by an index or pointer derived from data contained in a DNIS field associated with the incoming call.

21. The system according to claim 18 wherein the caller-specific data is obtained from a database containing data corresponding to the incoming call, and wherein data contained in an ANI field associated with the incoming call facilitates database access.

22. The system according to claim 18 wherein the caller-specific data is provided by the caller in the form of a text message.

23. The system according to claim 19 wherein the specialty type is inferred based on data corresponding to the caller obtained from the database.

24. The system according to claim 18 wherein the caller-specific data is derive from the content of at least one of the voice-mode and text-mode communication.

25. The system according to claim 18 wherein the transaction processing system further includes
- a voice response unit configured to request information from the caller;
- a voice recognition device configured to recognize verbal responses provided by the caller in response to the request from the voice response unit, and convert said verbal responses into digital data; and
- the digital data being provided to the agent station as the caller-specific data.

26. The system according to claim 25 wherein the caller-specific data corresponding to the incoming call is obtained from a database, and wherein the database is accessed by an index or pointer derived from said verbal responses.

27. The system according to claim 18 wherein the transmitted caller-specific data causes a corresponding application to be launched or maximized on an agent display screen.

28. A transaction processing system configured to route incoming calls from callers to agents corresponding to agent terminals associated with the transaction processing system, the incoming calls based on voice-mode communication and/or text-mode communication, the incoming calls routed from the caller to the agent terminal through a communication network, the system comprising:
- means for processing operatively the incoming calls configured to facilitate sending and receiving the voice-mode and/or the text-mode communications between the caller and the agent;
- a plurality of agent terminals operatively coupled to the means for processing, each agent terminal having a display screen for displaying data;
- means for prompting the caller to provide requested caller-specific data to the transaction processing system;
- means for storing containing entries corresponding to a plurality of callers, the means for storing accessible via an index derived from the caller specific data;
- wherein a specialty type corresponding to the incoming call is determined based on an entry in the means for storing, and the incoming call along with the caller-specific data is routed to a selected agent station based upon the determined specialty type, and wherein an application on the selected agent station is automatically launched or maximized based on the specialty type so that the application and the corresponding call-specific data is available to the agent when the agent services the incoming call.

29. The system according to claim 28 wherein the caller-specific data corresponding to the incoming call is obtained from the means for storing.

30. The system according to claim 29 wherein the means for storing is accessed by an index or pointer derived from data contained in a DNIS field associated with the incoming call.

31. The system according to claim 28 wherein the caller-specific data is obtained from the means for storing that contains data corresponding to the incoming call, and wherein data contained in an ANI field associated with the incoming call facilitates access of the means for storing.

32. The system according to claim 28 wherein the caller-specific data is provided by the caller in the form of a text message.

33. The system according to claim 29 wherein the specialty type is inferred based on data corresponding to the caller obtained from the means for storing.

34. The system according to claim 28 wherein the caller-specific data is derive from the content of at least one of the voice-mode and text-mode communication.

35. The system according to claim 28 wherein the transaction processing system further includes
- a voice response unit configured to request information from the caller;
- means for recognizing voice configured to recognize verbal responses provided by the caller in response to the request from the voice response unit, and convert said verbal responses into digital data; and
- the digital data being provided to the agent station as the caller-specific data.

36. The system according to claim 35 wherein the caller-specific data corresponding to the incoming call is obtained from a database, and wherein the database is accessed by an index or pointer derived from said verbal responses.

37. The system according to claim 28 wherein the transmitted caller-specific data causes a corresponding application to be launched or maximized on an agent display screen.

* * * * *